J. S. DINKELSPIEL.
COMPUTING DEVICE.
APPLICATION FILED MAY 15, 1909.
938,222.
Patented Oct. 26, 1909.
2 SHEETS—SHEET 1.
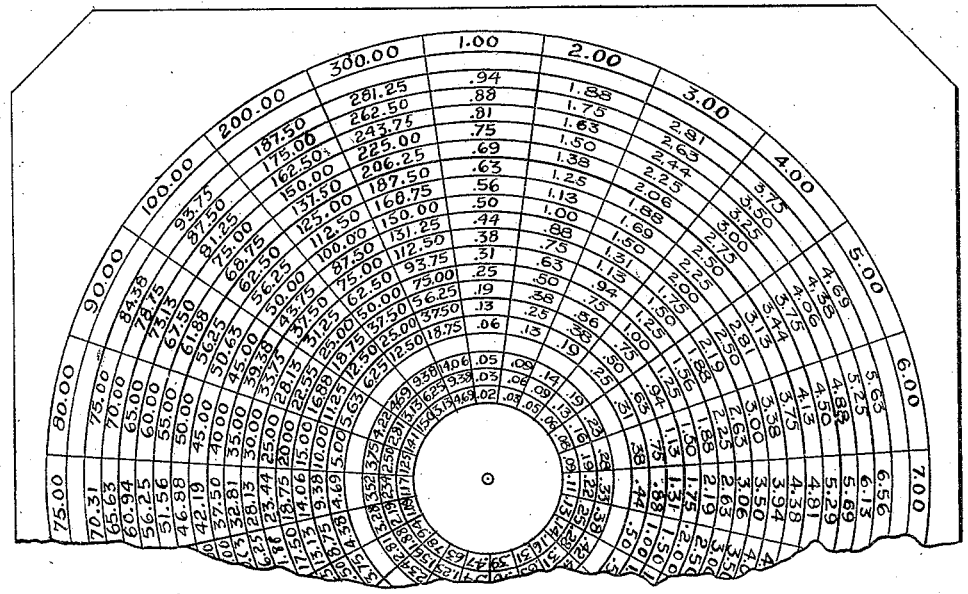
Fig. 1.
Fig. 4.
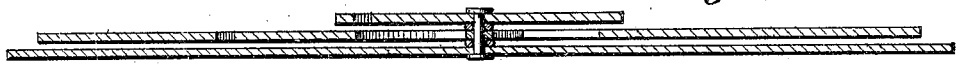
Fig. 3.
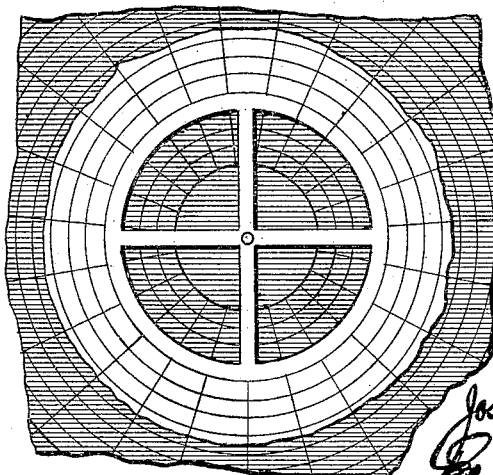
Witnesses
H. F. Löwenstein
James H. Marr
Inventor
Joseph S. Dinkelspiel
By Edward E. Clement
Attorney

J. S. DINKELSPIEL.
COMPUTING DEVICE.
APPLICATION FILED MAY 15, 1909.

938,222.

Patented Oct. 26, 1909.
2 SHEETS—SHEET 2.

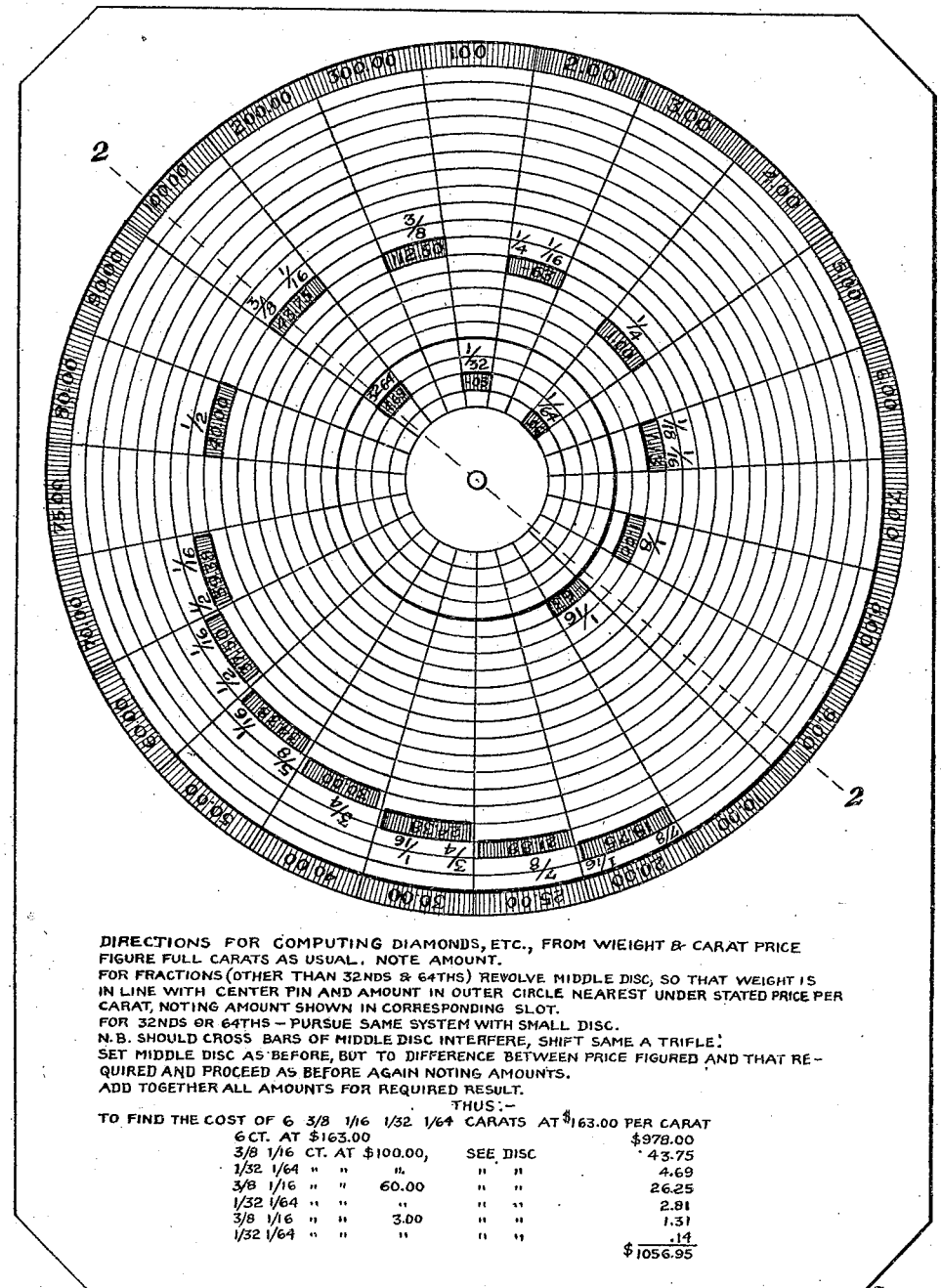

DIRECTIONS FOR COMPUTING DIAMONDS, ETC., FROM WIEGHT & CARAT PRICE
FIGURE FULL CARATS AS USUAL. NOTE AMOUNT.
FOR FRACTIONS (OTHER THAN 32NDS & 64THS) REVOLVE MIDDLE DISC, SO THAT WEIGHT IS
IN LINE WITH CENTER PIN AND AMOUNT IN OUTER CIRCLE NEAREST UNDER STATED PRICE PER
CARAT, NOTING AMOUNT SHOWN IN CORRESPONDING SLOT.
FOR 32NDS OR 64THS — PURSUE SAME SYSTEM WITH SMALL DISC.
N.B. SHOULD CROSS BARS OF MIDDLE DISC INTERFERE, SHIFT SAME A TRIFLE.
SET MIDDLE DISC AS BEFORE, BUT TO DIFFERENCE BETWEEN PRICE FIGURED AND THAT RE-
QUIRED AND PROCEED AS BEFORE AGAIN NOTING AMOUNTS.
ADD TOGETHER ALL AMOUNTS FOR REQUIRED RESULT.
THUS :—
TO FIND THE COST OF 6 3/8 1/16 1/32 1/64 CARATS AT $163.00 PER CARAT

```
    6 CT. AT $163.00                              $978.00
    3/8 1/16 CT. AT $100.00,    SEE DISC           43.75
    1/32 1/64  "   "     "          "    "          4.69
    3/8 1/16   "   "   60.00        "    "         26.25
    1/32 1/64  "   "     "          "    "          2.81
    3/8 1/16   "   "    3.00        "    "          1.31
    1/32 1/64  "   "     "          "    "           .14
                                                 $1056.95
```

Fig. 2.

Witnesses
H. F. Löwenstein
James H. Marr

Inventor
Joseph S. Dinkelspiel
By Edward E. Clement
Attorney

UNITED STATES PATENT OFFICE.

JOSEPH S. DINKELSPIEL, OF SAN FRANCISCO, CALIFORNIA.

COMPUTING DEVICE.

938,222.

Specification of Letters Patent. Patented Oct. 26, 1909.

Application filed May 15, 1909. Serial No. 496,174.

*To all whom it may concern:*

Be it known that I, JOSEPH S. DINKELSPIEL, a citizen of the United States, residing at San Francisco, in the county of San Francisco and State of California, have invented certain new and useful Improvements in Computing Devices, of which the following is a specification, reference being had therein to the accompanying drawing.

My invention relates to computing devices, and especially those in which the movement of certain mechanical parts in accordance with arbitrary data will automatically exhibit figures giving a desired result.

It has for its object to produce a device of this character which shall be simple, accurate, and especially adapted to the computation of fractional values. Such computation is required when dealing with diamonds, and my invention enables price to be readily determined from the known weight and carat price without any mental operation other than simple addition.

Briefly stated, the invention comprises a base upon which a circular space is provided with radial divisions or columns which are subdivided by successive circles spaced apart from the center to the circumference. These subdivisions contain fractional values computed at carat prices, which prices are found at the head of the columns, around the periphery of the circle. Mounted over this set of tables are two disks, each containing a certain number of openings arranged in cycloidal order and each separately rotatable upon the base. The larger disk has central openings in quadrature, so as to leave spaces for the operation of the smaller disk. By turning the two disks to bring the fractional amounts to be computed, under the proper carat values, readings may be taken through the openings, and these when added give the total desired value.

My invention is illustrated in the accompanying drawings in which—

Figure 1 is a face view of the base or foundation card with the disks removed. Fig. 2 is a view of the device complete, with disks in place. Fig. 3 is a fragmentary detail view showing the small disk removed and the openings in the large disk exposed. Fig. 4 is a section on the line 2—2 of Fig. 2.

Referring to the drawings, it will be observed that on the card shown in Fig. 1 a circular space is divided radially, and also by circles spaced out from the center, so as to produce columns of subdivided spaces, in which are placed the computed fractional values of different weights at different prices. The prices per carat are placed above the respective columns, around the outside of the circle. The large disk has four openings around the center and a series of smaller openings or windows marked from "1/16" up to "7/8–1/16", which indicate the fractional weights to be determined by the jeweler's scales. The small disk is secured on the same pivot as the larger one, and has in the present case only three openings arranged on a cycloidal curve, and numbered from "1/64" up to "1/32–1/64".

The operation of my invention is clearly indicated in the directions shown in full in Fig. 1. The example given is of a diamond which weighs 6, 3/8, 1/16, 1/32, 1/64, carats, as indicated by the merchant's scale, and which is to be sold at $163.00 per carat. Six carats is equal to $978.00, plus the fractions which are determined separately, each separate value set down in the column, and the total found by addition.

Having thus described my invention what I claim and desire to secure by Letters Patent is:

A computing device for fractional values comprising a base carrying a set of radial columns of prices, the fractions for which these prices are computed increasing progressively from the center to the circumference of the circle, and their base values or unit prices increasing progressively around the circle, every column being filled, a rotatable disk of relatively large diameter pivoted on a spider at the center of the circle so as to cover all the figures outside of the diameter of the spider, said disk having windows or openings arranged on a cycloidal curve beginning and ending at the same radius each window representing a particular fractional weight or quantity, while the curve is determined by the progression of these fractions and the unit values; and a second disk of relatively small diameter also pivoted at the center overlying the central opening and the spider of the larger disk, and similarly provided with openings or windows representing different fractions from those on the larger disk, but similarly arranged on a cycloidal curve determined by the progression of fractions and unit values; said disks being independently movable, the readings on the small disk being taken through the central opening on the large disk, and the windows in the two disks forming separate series unrelated in their order of progression, and therefore capable of supplementing each other's findings in the same radial columns.

In testimony whereof I affix my signature in presence of two witnesses.

JOSEPH S. DINKELSPIEL.

Witnesses:
D. E. JOSEPHI,
H. ABRAHAM.